United States Patent [19]

Schnaibel et al.

[11] 3,874,741
[45] Apr. 1, 1975

[54] WHEEL BRAKE ANTILOCK SYSTEM WITH NOISE SIGNAL REJECTION CIRCUIT

[75] Inventors: Eberhard Schnaibel, Hemmingen; Helmut Fleischer, Schwieberdingen, both of Germany

[73] Assignee: Robert Bosch GmbH, Stuttgart, Germany

[22] Filed: Sept. 7, 1973

[21] Appl. No.: 395,306

[30] Foreign Application Priority Data
Sept. 7, 1972 Germany............................ 2243833

[52] U.S. Cl............................ 303/21 BE, 188/181 A
[51] Int. Cl............................................... B60t 8/12
[58] Field of Search ............... 188/181; 303/20, 21; 317/5; 324/161–162; 340/53, 262, 263

[56] References Cited
UNITED STATES PATENTS

| | | | |
|---|---|---|---|
| 3,017,145 | 1/1962 | Yarber............................ | 303/21 BE |
| 3,554,612 | 1/1971 | Harned........................... | 303/21 BE |
| 3,556,610 | 1/1971 | Leiber............................. | 303/21 BE UX |
| 3,637,264 | 1/1972 | Leiber et al. ................... | 188/181 A X |
| 3,672,730 | 6/1972 | Burckhardt et al............ | 303/21 BE |
| 3,677,609 | 7/1972 | Davis et al...................... | 303/21 BE |
| 3,734,573 | 5/1973 | Davis et al...................... | 303/21 BE X |
| 3,744,851 | 7/1973 | Burckhardt et al............ | 303/21 BE |
| 3,768,872 | 10/1973 | Urban et al..................... | 303/21 BE |
| 3,778,117 | 12/1973 | Needham........................ | 303/21 CG |

*Primary Examiner*—Trygve M. Blix
*Assistant Examiner*—Stephen G. Kunin
*Attorney, Agent, or Firm*—Flynn & Frishauf

[57] ABSTRACT

To prevent spurious response due to spurious signals in the electrical system of a vehicle, a group of threshold switches responding to different wheel speed rates of change are provided; in advance of a differentiator, a first low pass filter of a band pass range of about 45 Hz is connected, the output of the differentiator having a second low pass filter of a band pass range of about 18 Hz connected thereto, the threshold switches being connected either to the differentiator directly or behind the second low pass filter. Some of the threshold switches preferably have threshold shift inputs which are energized over time delay circuits to shift the threshold levels, after having responded, to prevent extended bleeding of pressurized brake fluid, for responsiveness to changes in road condition and even response of systems associated with different wheel axles.

22 Claims, 7 Drawing Figures

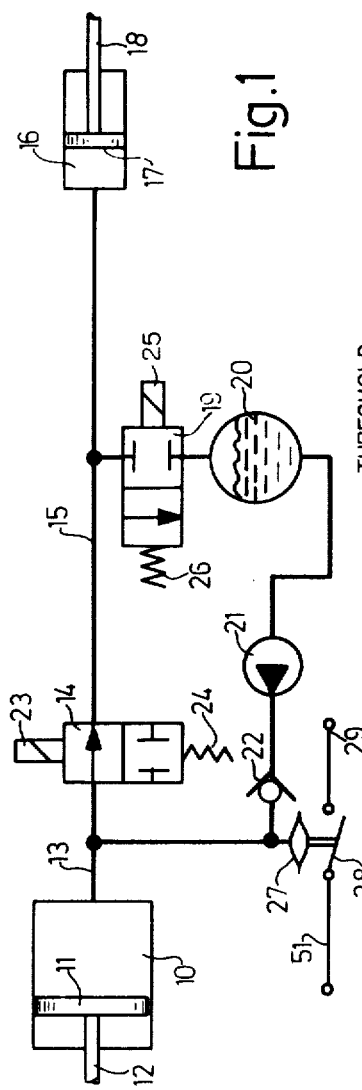
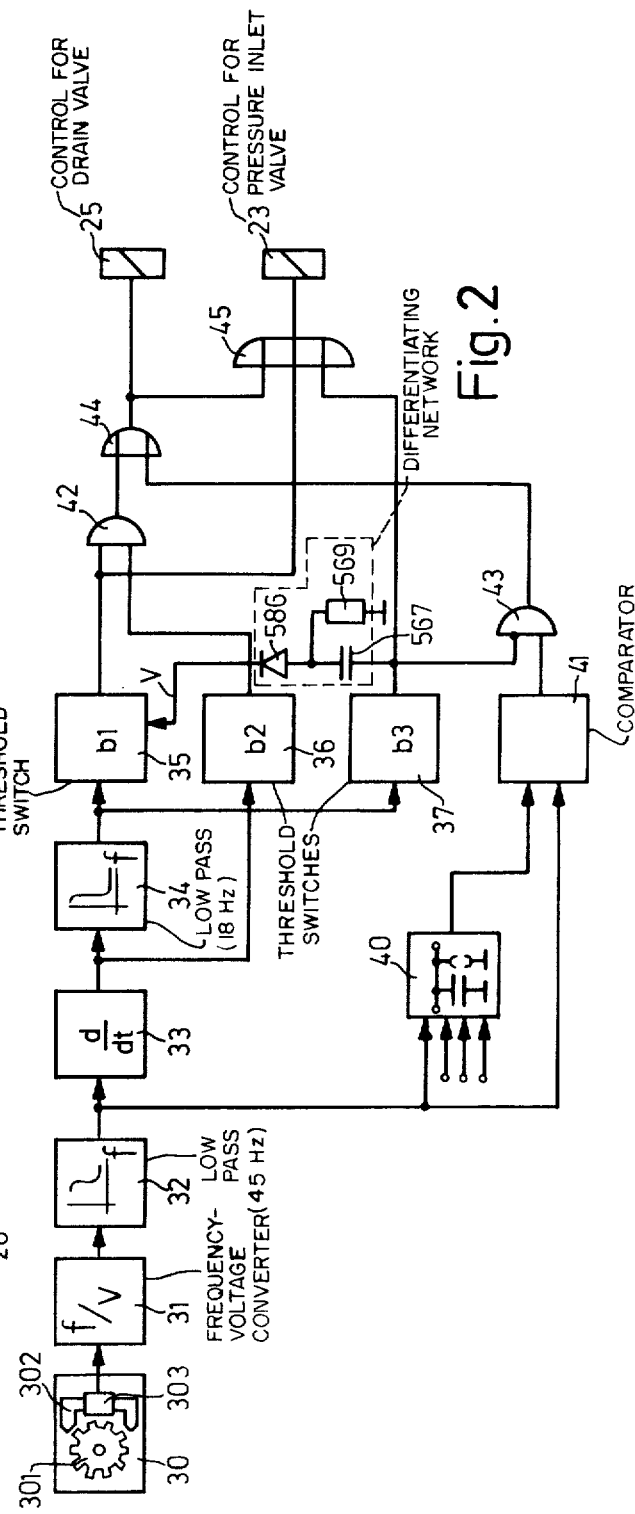

WHEEL BRAKE ANTILOCK SYSTEM WITH NOISE SIGNAL REJECTION CIRCUIT

CROSS REFERENCE TO RELATED APPLICATIONS

U.S. Ser. No. 288,791, Sept. 13, 1972;
U.S. Ser. No. 325,569, Jan. 22, 1973 now U.S. Pat. No. 3,820,857;
U.S. Ser. No. 328,047, Jan. 30, 1973, now U.S. Pat. No. 3,833,270;
U.S. Ser. No. 330,674, Feb. 8, 1973 now U.S. Pat. No. 3,829,168.

The present invention relates to a vehicle wheel brake antilock system, and more particularly to such a system in which a fluid, typically liquid-operated brake is coupled to a sensing apparatus which controls application of pressurized brake fluid thereto.

Various vehicle wheel antilock systems have been proposed, and some of them are discussed and claimed in the cross referenced applications. In some such systems, threshold switches are used which control the opening and closing of bleeder valves connected to the brakes of the individual wheels. One such threshold switch is used which has a wide switching hysteresis. It opens a bleeder valve when a predetermined value of wheel deceleration has been sensed, and closes the bleeder valve again if a positive wheel acceleration is sensed, as a result of drop of brake fluid pressure in the respective wheel brake. In such a system, the threshold switch is controlled directly by a differentiating unit. It is possible that a spurious error pulse triggers the differentiator, and hence the threshold switch. Such a spurious noise pulse will then result in a drop in braking pressure which, possibly, cannot be terminated any more if, upon termination of the noise pulse, positive acceleration is not sensed, or not transmitted to the first threshold switch. Thus, under ordinary braking, which does not lead to locking of the wheel, a suddenly arising noise pulse may cause complete loss of all braking pressure.

It would be theoretically possible to eliminate such a condition by connecting a low pass filter in series with the first threshold switch, which is so designed, that noise pulses will be filtered therefrom. Another solution would be to introduce a delay, with a delay threshold of such delay time that noise pulses are clearly eliminated and cannot lead to response of the first threshold switch. Both solutions have disadvantages: in the first solution, the switch-ON point, as well as the switch-OFF point, that is, the opening and closing time of the bleeder valve, is delayed by a predetermined time. In the second system, the response sensitivity of the entire antilock system is substantially decreased. Delaying the turn-on of the bleeder valve, that is, delaying the initiation of dropping of braking pressure can be accepted. Delaying, however, the termination of decrease of braking effort is undesirable, since the braking pressure may drop too low, resulting in high pressure control amplitude and wide swings in braking effort. This increases the braking distance, and causes jolts in the vehicle.

It is an object of the present invention to improve a vehicle wheel brake antilock system in such a manner that electrical noise and other spurious pulses can no longer result in undesired dropping of braking pressure, and which, nevertheless, has good response sensitivity, and low pressure swings, that is, which retains the desirable characteristics of a system which, however, may be subject to noise pulses.

SUBJECT MATTER OF THE PRESENT INVENTION

Briefly, the differentiator of the standard system has a first low pass filter connected in advance thereof, and a second low pass filter behind the differentiator. A first threshold switch is connected to the output of the second low pass filter. A second threshold switch is connected to the output of the differentiator. The bleeder valve is then controlled by both threshold switches over an AND gate, that is, upon logical conjunction of signals from both threshold switches.

In accordance with a feature of the invention, the first low pass filter is set for a relatively high upper limiting frequency, that is, it introduces only a small delay time. It serves only for rough filtering of the output voltage of the tachometer generator, and which supplies a wheel speed signal. The second low pass filter, however, is designed to have low limiting frequencies, and thus introduces a greater delay time. In contrast to the known wheel antilock systems, two threshold switches are used to control the bleeder valve. By suitable selection of the response levels and the switching hystereses of the threshold switches, a closed condition of the bleeder valve upon continuous uniform circumferential wheel speed can be ensured. Thus, noise or spurious pulses may cause short-time response of the first threshold switch and thus may lead to momentary opening of the bleeder valve. The second threshold switch, however, which is controlled with a low delay time terminates in any event any drop in braking pressure rapidly after termination of the delay pulse. By setting the two threshold switches to have different delay times, termination of bleeding of brake fluid is ensured, with some delay, which is, however, small and can be neglected, even though the initial dropping of brake pressure is also delayed to some extent. The pressure amplitude swings, during operation of the system, are therefore limited to low values.

Wheel antilock systems, as proposed, can also initiate a pressure rise when the system is in operation, although the specific vehicle wheel has not yet sufficiently re-accelerated. In accordance with a feature of the invention, a third threshold switch is provided, connected to the output of a second low pass filter. The pressure fluid inlet valve is controlled by a solenoid winding, over an OR gate, which is enabled by the first or the third threshold switch. The pressure inlet valve, therefore, is controlled by two threshold switches which have input signals with a relatively high delay time, thereby ensuring that the inlet valve is not again opened by a spurious or noise pulse.

The invention will be described by way of example with reference to the accompanying drawings, wherein:

FIG. 1 is a highly schematic circuit diagram of a vehicle wheel braking system which can be used with a wheel antilock system;

FIG. 2 is a schematic, fragmentary block circuit diagram of one embodiment of the invention;

Figure 3:
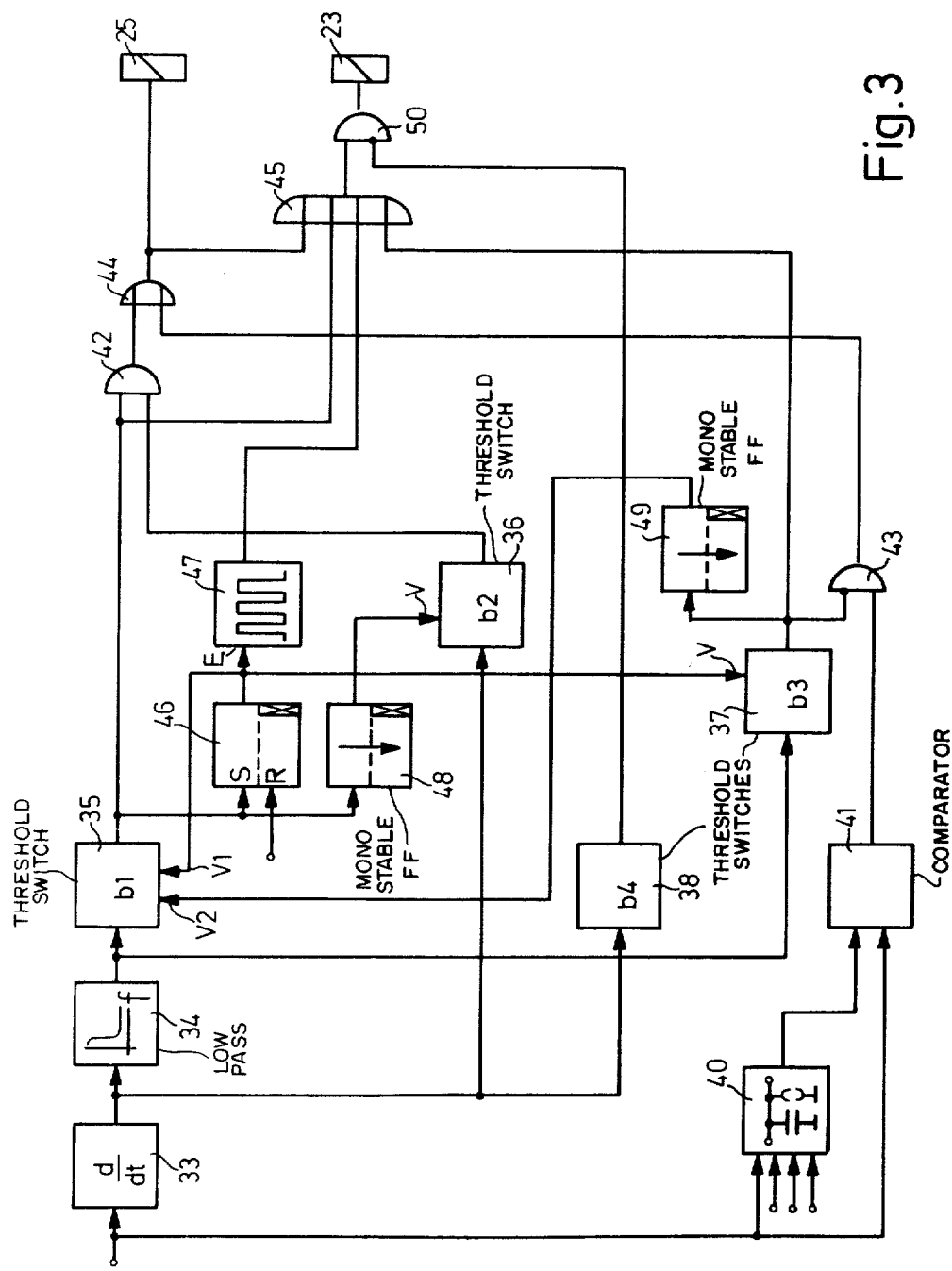
FIG. 3 is a schematic block circuit diagram of a second embodiment of the invention.

A master brake cylinder 10 (FIG. 1) has a piston 11 therein which can be shifted by means of an operating rod 12, which is operated, for example, by a brake pedal (not shown), directly, or over a servo or power brake system. The master cylinder 10 provides pressurized brake fluid, typically braking oil over a main brake line 13, and inlet valve 14, to a wheel brake line 15 which connects to a wheel brake cylinder 16, in which a brake piston 17 is located which operates by means of piston rod 18 the brake shoes, or brake pads of a respective vehicle wheel brake. The wheel brake line 15 is connected over a normally closed outlet valve 19 with a sump 20, in which brake fluid is collected which is drained from cylinder 16. A return pump 21 supplies the brake fluid over a check valve 22 back to the main brake line 13. A pressure sensing device 27 senses rise in the main brake line 13 and, when a pressure increase is sensed, operates switch 28 which functions as the brake light switch. When switch 28 is closed, terminal 29 is energized from a main supply bus 51.

The inlet valve 14 is normally open, and held in this position by means of a spring 24. Inlet valve 14 is a 2/2 way valve and, in quiescent or non-energized position, provides a free path for brake fluid from the main brake line 13 to the wheel brake line 15. When the associated solenoid 23 is energized, valve 14 closes and interrupts flow of pressurized brake fluid from line 13 to an individual brake line 15. The outlet valve 19 is normally closed and held in its closed, quiescent position by means of a spring 26; upon energization of the associated solenoid 25, valve 19 opens and provides a free path from wheel brake line 15 to the sump 20.

Operation of brake system: in normal condition, and before initiation of braking, the system will be in the position shown in FIG. 1. The brake light switch 28 is open. When the brake pedal is operated, providing displacement to piston rod 12, line 13 will be pressurized and switch 28 will close. Simultaneously, pressurized brake fluid will flow from the master brake cylinder 10 to the wheel brake cylinder 16, and the pressure in the wheel brake cylinder will follow that in the master brake cylinder 10. Upon start of braking, the pressure will thus rise.

If braking pressure is to be maintained constant or even, winding 23 of inlet valve 14 is energized. Both valves 14, 19 will then be closed and no further pressurized brake fluid can be supplied to the wheel brake cylinder 16; nor can brake fluid bleed from the cylinder 16, so that the pressure in the closed system of which wheel brake cylinder is a part, will remain constant. If braking pressure is to be dropped, the inlet valve 14 must be energized to close, and interrupt the path of pressurized brake fluid from line 13, and outlet valve 19 must be energized, to open, and permit drainage of brake fluid into sump 20. Hence, in each control cycle, upon drop of brake pressure, a portion of the fluid will flow into the sump 20, the master brake cylinder 10 would be slowly emptied; the fluid supply pump 21, however, provides already during initiation of braking further brake fluid, which has collected in sump 20, back to the main brake line 13, and hence into the master cylinder 10.

There is a fourth possible combination of positions of the valves 14, 19. This combination must be avoided, and this is done by means of an electrical interlock circuit, or a mechanical interlock: if the outlet valve 19 is energized, to be open, and likewise the inlet valve 14 is open (de-energized), then pressurized brake fluid can flow directly from master cylinder 10 and bleed immediately into the sump 20, without any effect on the brake cylinder at all, but rather draining off brake fluid from the master cylinder 10, to rapidly drain the master cylinder. The circuits of FIGS. 2 and 3 include an electrical interlock circuit which inhibits this condition.

Referring to FIG. 2, showing a first embodiment: a pulse tachometer 30, at the input, includes a gear wheel 301 with ferromagnetic teeth, driven in synchronism with vehicle speed. The ferromagnetic teeth of gear wheel 301 are opposed by two pole pieces of a yoke 302 on which a coil 303 is wound. A series circuit formed of a freuqency-dc converter 31, a first low pass filter 32, a differentiator 33, and a second low pass filter 34 is connected to the differentiator; a speed simulating stage 40 is connected with a first input to the output of the first low pass filter 32. Further inputs of the speed simulating stage 40 are connected to similar first low pass filters of vehicle wheel brake antilock systems aassociated with other wheels of the vehicle. These other output connections are indicated by the arrows. The vehicle wheel simulating stage 40 is connected to a comparating stage 41. The comparator 41 has connected thereto the output of the first low pass filter 32 and of the vehicle wheel speed simulating stage 40. The outputs of the first and second threshold switches 35, 36 are connected to the inputs of an AND gate 42. A further AND gate 43 has its input connected to the ouputs of the third threshold switch 37, and to the speed comparator circuit 41. The input which is connected to the third threshold switch 37 is an inverting input, as indicated by the dot connection. The outputs of the two AND gates 43, 42 are connected to the inputs of an OR gate 44. The output of OR gate 44 connects to the winding 25 of the drain valve 19. The winding 23 of the inlet valve 14 is controlled, likewise, by an OR gate 45, having three inputs. The three inputs are connected, respectively, to the outputs of OR gate 44, to the output of the first threshold switch 35, and the output of the third threshold switch 37, respectively.

The first threshold switch 35 has another input V. This input is a threshold change terminal, and connected over a differentiating network including resistor 569, capacitor 567, and a diode 586. The non-connected terminal of resistor 569 is connected to ground or chassis. The operation of the R/C differentiating network, and the function in connection with the threshold changing terminal V will be explained in detail in connection with FIG. 6, below.

Operation of system of FIG. 2: pulse source 30, driving the gear wheel 301 rotates with the assocated vehicle wheel. The reluctance of the magnetic path formed by the gear wheel 301 and yoke 302 changes as the air gap changes, to provide output pulses which have a frequency, or pulse repetition rate which is proportional to wheel speed. Coil 303 has pulses induced therein, which are changed in variable d-c voltages in the converter 31. The value of the output voltage is proportional to wheel speed. The voltage converter may, for example be a sample-and-hold circuit. Under some circumstances, the frequency-voltage converter need not be used, and the first low pass filter 32 can provide the necessary output voltage.

The voltage from low pass filter 32 is differentiated in differentiator 33, so that the signal at the output of the differentiator 33 will be a wheel acceleration signal. The negative of an acceleration signal is a wheel deceleration signal, and, in the description which follows, an algebraically negative "acceleration" signal is to be deemed to mean deceleration. The basis for acceleration will be taken as gravity, $1g = 10$ m/s$^2$. This is a suitable basic value, since a wheel deceleration of 1g is optimally obtainable when braking on a dry surface. the actual wheel deceleration may be much greater upon incipient wheel locking. The invention will be described, in general, with respect to terminology customary in digital switching technology, that is, the concept of a 0-signal means that a particular line or junction is at a voltage roughly comparable to that of ground, or chassis, or negative line, whereas a 1-signal corresponds to a voltage roughly comparable to the positive line of supply.

The various switching states, and switching thresholds of the thresholds switches are given in Table 1, which corresponds to the first embodiment of FIG. 2.

The first and third threshold switch, in the quiescent condition of the circuit provide a 0-signal upon acceleration 0. The second threshold switch 36 provides a 1-signal. The first threshold switch 35, with switching threshold $b1$ provides a 1-signal when the wheel deceleration exceeds 3.5 g, and retains the 1-signal beyond the termination of the deceleration phase, until a positive acceleration of 1.2 g is reached. The second thresold switch 36, provides a 1-signal. It has a threshold switch $b_2$. Its response level is at +0.1 g, and it retains the 1-signal over the entire deceleration phase until a re-acceleration phase which reaches +1.0g triggers the turn-off level of the second threshold switch 36. The third threshold switch 37, with switching threshold $b_3$ operates reversely; it provides a 0-signal during the deceleration phase of the wheel. Upon a subsequent acceleration phase, however, which exceeds a positive acceleration of +1 g, the output signal of the third threshold switch 37 will change to a 1-signal. This 1-signal is maintained until the wheel acceleration drops below 0.5 g.

The control cycle of the antilock system is seen in connection with Table 2.

Table 1

| Thereshold Switch | ON-response level | OFF-response level | Signal when ON |
|---|---|---|---|
| 35(b1) | − 3.5g | + 1.2g | 1 |
| 36(b2) | + 0.1g | + 1 g | 1 |
| 37(b3) | + 1 g | + 0.5g | 1 |

Table 2

| Wheel acceleration | b1 | b2 | b3 | Inlet Valve Coil 23 | Outlet Valve Coil 25 | Pressure |
|---|---|---|---|---|---|---|
| − 1g | 0 | 1 | 0 | 0 | 0 | rise |
| − 4g | 1 | 1 | 0 | 1 | 1 | drop |

Table 2-Continued

| Wheel acceleration | b1 | b2 | b3 | Inlet Valve Coil 23 | Outlet Valve Coil 25 | Pressure |
|---|---|---|---|---|---|---|
| + 1.1g | 1 | 0 | 1 | 1 | 0 | even |
| + 2.0g | 0 | 0 | 1 | 1 | 0 | even |
| + 0.2g | 0 | 0 | 0 | 0 | 0 | rise | inlet valve 14  0: open  1: closed
outlet valve 19  0: closed  1: open

The first column of Table 2 illustrates various values of wheel rate of change of speed (acceleration, and negative acceleration corresponding to deceleration). The subsequent three columns provide the control signals of the three threshold switches and the further two columns the control signals for the valves 14 and 19, respectively. The last column describes the pressure relationship.

Upon initiation of braking, the on-threshold $b_2$ of the second threshold switch 36, namely +0.1g, will have been passed; this condition at initiation of braking is illustrated in line 1 of table 2. Only the second threshold switch 36 provides a 1-signal. This 1-signal is, however, blocked by AND gate 42 since the first threshold switch 35 continues to provide a 0-signal. Inlet valve 14 will thus remain in open condition and braking pressure will rise.

As the braking pressure rises, so that the locking pressure is exceeded and the wheel begins to decelerate rapidly, the on-threshold level $b_1$ of the first threshold switch 35 will be passed, and the second line of Table 2 illustrates the then pertaining switching conditions at the wheel deceleration of 4g. Both threshold switches 35, 36 now provide a 1-signal, and AND gate 42 will be energized, which is transmitted to the winding 25 of the outlet valve over OR gate 44. Simultaneously, the 1-signal will be applied to the first threshold switch to an input of the OR gate 45, so that the inlet valve 14 will pull in, thus interrupting fluid flow from the master cylinder 10. Pressurized brake fluid will thus bleed from the brake line 15, as described in connection with FIG. 1.

The connection of the output of OR gate 44 to an input of OR gate 45 provides an electrical interlock circuit which prevents that inlet valve 14 remains open if outlet valve 19 is open.

Due to bleeding braking fluid, the braking effort decreases, so that the wheel deceleration will decrease. When the braking effort has decreased sufficiently, the wheel will again accelerate, and differentiator 33 will provide a positive acceleration signal, as indicated in the third line of Table 2. It is there assumed that the wheel acceleration, in the acceleration phase, has reached 1.1g, exceeding the switching threshold $b_3$ of the third threshold switch 37, which was assumed to be set at +1.0g. Likewise, the off-threshold of the second threshold switch 36 has been exceeded. The third threshold switch 36 has been exceeded. The third threshold switch, therefore, provides a 1-signal, and the second threshold switch a 0-signal. AND gate 42 thus becomes blocked, and drain valve 19 will close again since OR gate 44 will no longer pass an output. The winding 23 of the inlet valve 14, however, will continue to be energized since OR gate 45 receives 1-signals from the two threshold switches 35, 37. Thus, the wheel brake cylinder is entirely isolated from the pressure fluid supply, and will retain its preceding pressure; braking effort will remain even or constant, since the braking pressure within the system will remain constant.

The braking pressure is held even or constant at a low level. This permits the wheel to accelerate further and it will eventually exceed the off-threshold of 1.2 g of the first threshold switch 35. Line 4 of Table 2 illustrates the condition in which the wheel has accelerated even to a value of +2.0g. Only the third threshold switch 37 continues to provide a 1-signal, which is applied over the OR gate 45 to energize winding 23 of inlet valve 14 and hold the inlet valve closed. This inhibits application of pressurized brake fluid, so that the wheel can continue to accelerate. The braking pressure is held at a low value. As the wheel circumferential speed approaches vehicle speed, acceleration of the wheel decreases, and as soon as the acceleration passes the threshold level of +0.5g of the third threshold switch 37, it changes back into its initial state to provide a 0-signal. This re-establishes the initial condition of the system, which existed at the initiation of braking. The bleeder valve 19 is closed, inlet valve 14 is open, and braking pressure can increase. These cycles will repeat, periodically, so long as a brake pedal or brake controller is operated so strongly that locking pressure is exceeded.

The vehicle speed simulating stage 40, and the speed comparison circuit 41 have not been considered so far. Likewise, the operation of differentiator element 567, 568, 569 has not been described. The differentiating element is not necessary in the above described case, if the turn-off threshold level of the first threshold switch (+1.2g) is sufficiently high above the turn-on threshold of the third threshold switch 37 (1.0g.). Such an overlap of 0.2g is absolutely necessary in order to ensure that the first threshold switch 35 does not change back before the third threshold switch 37 changes back into its initial state. If the overlap will not be present, the braking pressure would rise briefly at the end of the brake fluid dropping stage. This would interfere with proper, and smooth re-acceleration of the wheel.

The overlap must not be excessively great since, otherwise, the situation might arise that upon re-acceleration of the wheel, the turn-on threshold of the third threshold switch is exceeded, but the turn-off of the first threshold switch 35 is not reached any more. If this were to happen, the first threshold switch 35 could not reset, and the inlet valve 14 would remain closed at all times, thus interfering with application of braking pressure. The differentiating circuit formed of elements 567, 568, 569 is desirable, since the first threshold switch 75 can then be so dimensioned that its turn-on threshold, as before, is set at −3.5g, but that its turn-off threshold is set at a high positive value, for example +3.0g. This ensures sufficient overlap with the third threshold switch 37 in any event. The differentiating circuit 567, 568, 569 ensures that the first threshold switch 35 resets as soon as the third threshold switch 37 responds, that is, at +1.0g. This is obtained by briefly applying a pulse over capacitor 567 as soon as the third threshold switch responds. This pulse briefly resets both threshold levels of the first threshold switch by a predetermined value, for example 5g, in negative direction. This brief shift in the threshold level will be described in more detail in connection with FIG. 6, below.

The signals of the third line of Table 2 will, then, change if the operation of the differentiator 567, 568, 569 is considered. They will have the same values as the signals in the fourth line of Table 2. This does not change the braking pressure, however, since both the third and fourth line of Table 2 indicate that braking pressure is held constant, or even.

Embodiment of FIG. 3: the initial circuit components 30, 31, 32 are identical to those of the first example described in connection with FIG. 2, and they are not further shown in FIG. 3. The interconnection of differentiator 33, low pass filter 34, and the three threshold switches 35, 36, 37, AND gates 42, 43, OR gates 44, 45, and vehicle simulation stage 40 as well as speed comparison stage 41 are similar to the elements described in connection with the first example and will not be described again. All the similar elements have been given the same reference numerals.

A fourth threshold switch 38 is used in the example of FIG. 3, having its input connected to the output of differentiator 33. The solenoid winding 23 of the inlet valve 14 has an AND gate 50 connected to its input, one input of the AND gate, itself, being connected to the output of the OR gate, and the other input, over an inverting connection, to the output of the fourth threshold switch 38. A control storage device 46, which, preferably, is a bistable flip-flop, has its set input S connected to the output of the first threshold switch 35. The reset input R of the flip-flop 46 will be described in detail in connection with FIG. 7. The output of flip-flop 46 is connected to a first threshold shift terminal V1 of the first threshold switch 35, with a threshold shift terminal V of the third threshold switch 37, and with a blocking input E of a pulse or clock source 47. The output of the clock source 47 is connected to a fourth input of the OR gate 45. The clock source may, for example, be an astable multivibrator. A first timing circuit 48, which, preferably, is a monostable multivibrator (MMV) is connected with its input to the output of the first threshold switch 35. A second MMV 49, forming a second timing circuit, has its input connected to the output of the third threshold switch 37, and its output to a second threshold shift terminal V2 of the first threshold switch 35.

The values of the threshold responses of the various threshold switches are shown in Table 3, which is similarly arranged to Table 1.

The threshold levels of the first three threshold switches 35, 36, 37 are similar to those discussed in connection with the first example, FIG. 2. The ordinary threshold levels of the first threshold switch 35 are reached only if the first threshold level change input V1 has a 1-signal. In advance of the 1-signal at terminal V1, that is, in advance of setting of the flip-flop (FF) 46, forming the control memory, the on-threshold level is set for −4.5g, and the off-level to 0g. If the second threshold shift terminal V2 has a 1-signal, then the on-level of the first threshold switch 35 is changed to −7g, and the off-level to −2.5g.

The on-threshold level of the second threshold switch 36 is set for +0.1g, so that the second threshold switch provides a 1-signal already in its quiescent position, which it retains during the entire deceleration portion of the braking cycle. If a 1-signal is supplied to the threshold shift input V of the second threshold switch 36, then the switching threshold levels are changed to −4g and −3.1g, respectively. A 1-signal to the threshold change input V on the third threshold switch 37 changes the thresholds by 3g in negative direction. The threshold levels of the third threshold switch 37, in advance of the setting of the control memory 46, are at high positive value and reach their normal values only when a 1-signal is applied to the threshold shift input V. The fourth threshold switch 38 does not have hysteresis, so that both threshold levels are at +6g. Above +6g the fourth threshold switch 38 provides a 1-signal. The output signals of the various stages, and the pressure relationships of a control cycle are illustrated in Table 4.

Table 3

| Threshold Switch | ON-level | OFF-level | Signal when ON |
|---|---|---|---|
| 35 (b1) | − 4.5g | 0g | 1 |
| 35 + V1 | − 3.5g | + 1g | 1 |
| 35 + V2 | − 7g | − 2.5g | 1 |
| 36 (b2) | + 0.1g | + 1g | 1 |
| 36 + V | − 4g | − 3.1g | 1 |
| 37 (b3) | + 4g | + 3g | 1 |
| 37 + V | + 1g | 0g | 1 |
| 38 (b4) | + 6g | + 6g | 1 |

Table 4

| Wheel speed rate of change | Threshold levels 35 b1 | 36 b2 | 37 b3 | 38 b4 | Inlet valve 14 | Outlet valve 19 | brake pressure |
|---|---|---|---|---|---|---|---|
| −1g | 0 | 1 | 0 | 0 | 0 | 0 | rise |
| −5g | 1 | 1 | 0 | 0 | 1 | 1 | drop |
| +1.5g | 0 | 0 | 1 | 0 | 1 | 0 | constant |
| +7g | 0 | 0 | 1 | 1 | 0 | 0 | rise |
| +2g | 0 | 0 | 1 | 0 | 1 | 0 | constant |
| −1g | 0 | 1 | 0 | 0 | pulsed | 0 | pulsed rise |

Table 5

| | | | | | | | |
|---|---|---|---|---|---|---|---|
| −1g | 0 | 1 | 0 | 0 | pulsed | 0 | pulsed rise |
| −3g | 1(5ms) | 1 | 0 | 1 | 1 (pulsed) | 1 | pulsed drop (20Hz) |
| −4g | 1 | 1 | 0 | 0 | 1 | 1 | drop |
| +1.5g +g | 0 | 0 | 1 | 0 | 1 | 0 | constant | inlet valve 14  0: open  1: closed
outlet valve 19  0: closed  1: open

The first three lines of table 4 correspond, essentially, to the first three lines of Table 2, so that a detailed description is not necessary. The control cycle again starts with a pressure rise, pressure drop, and a constant pressure phase. It should be noted only that the control store FF 46 is set at the first response of the first threshold switch 35. The 1-output signal of the FF 46 changes the threshold response of the first threshold switch 35 in positive direction, and changes the threshold response of the third threshold switch 37 in negative direction. Further, the 1-signal at the output of FF 46 starts pulse source 47 so that it can provide pulses to OR gate 45.

The control cycle in accordance with Table 4 is based on a setting in which the braking pressure is dropped to such a low value that the re-acceleration phase of the wheel reaches high positive acceleration values. The fourth line of Table 4 indicates the switching state for an acceleration of +7g. The fourth threshold switch 38 provides a 1-signal besides the third threshold switch 37. Since the output signal of the fourth threshold switch 38 is connected to an inverting input of the AND gate 50 (indicated by a dot input), AND gate 50 does not provide a 1-signal to solenoid 23 of inlet valve 14 and the inlet valve will open. Simultaneously, the solenoid 25 of bleeding valve 19 will receive a 0-signal, so that the bleeding valve will close; neither valve is energized. Braking pressure rises rapidly, in order to compensate for the high drop in braking pressure before.

The circumferential wheel speed will rapidly approach that corresponding to unbraked vehicle speed, and wheel acceleration again drops below the response level of the fourth threshold switch 38. solenoid 23 will receive a 1-signal from the third threshold switch 37 over OR gate 45 and AND gate 50, so that a constant pressure phase of wheel brake pressure will result, as indicated in the penultimate line of Table 4.

When wheel acceleration has decreased to 0g, then the third threshold switch 37 will revert back to its output position and provide a 0-signal, as indicated in the last line of Table 4, for a deceleration of −1g.

The last line of Table 4 illustrates initiation of a second control cycle; it differs from the first cycle in that the pulse source 47 is started and connected. Inlet valve 14 cannot remain open at all times, rather, it is opened periodically over gates 45, 50, which energize the winding 23 in pulses. Inlet valve 14 thus opens and closes, permitting braking pressure to be applied gradually, so that the wheel braking pressure will rise gradually. This feature permits a gradual increase in braking pressure, so that locking pressure is not reached so quickly. A wheel remains for a longer period in the region of applied pressure which is below that of locking pressure, and thus a higher braking effort can be transmitted between wheel and road; the overall braking distance is foreshortened.

The example illustrated in FIG. 3 thus provides a rise in braking pressure, if continued to be commanded, only in pulses, under control of pulse source 47. It is possible to cause the braking pressure to rise rapidly if the fourth threshold switch 38 has responded. This is possible only, however, if extreme high values of wheel acceleration should be reached, that is, if the braking pressure has dropped too far in the preceding control cycle.

Operation of shift inputs V, example of FIG. 3: The threshold levels of the first threshold switch 35 are only then at their normal value when the first threshold shift input V1 has a 1-signal applied thereto. In advance thereof, that is, in advance of setting of the control FF 46, the levels are shifted by 1g in negative direction, so that the entire switching hysteresis of the first threshold switch 35 is shifted into the deceleration region. This ensures that the first threshold switch 35, in ordinary operation, and without braking, is always reset to a 0-signal. Additionally, the noise susceptibility, that is, the susceptibility to stray pulses is decreased, since the input threshold level is set for a relatively high deceleration value, that is, to −4.5g. Stray noise pulses, therefore, could not cause threshold switch 35 to respond.

The second timing circuit 49 is triggered at the end of each control cycle, that is, when the third threshold switch 37 resets. When the third threshold switch 37 has transferred to a 0-signal, the output of the second timing circuit 49 provides a 1-signal for a certain delay time, for example 30 milliseconds, which is connected over the second threshold shift terminal V2 to the first threshold switch 35 to set the first threshold switch 35 to a level of −7g. It is found desirable to provide this shift, in order to filter out oscillations of the vehicle, such as brake dip, or the like. During braking, the axle of the vehicle is strained with respect to the springing of the vehicle. During the subsequent re-acceleration phase of the wheel, this strain, which causes a certain shift due to the resiliency of the vehicle suspension is removed, since braking effort is decreased. At the end of the re-acceleration phase, the vehicle axle may swing back into the region previously strained, and this swing back has the effect on the wheel similar to deceleration. The wheel may thus sense a fictitious deceleration value which is in the order of magnitude of the turn-on level of the first threshold switch 35. setting the response to a much lower level overcomes this difficulty.

It would be possible to disconnect the first threshold switch 35 entirely during the delay time of the second timing circuit, that is, MMV 49, in order to ensure that no deceleration signal is simulated due to oscillations arising within the chassis, and the suspension of the vehicle. This, however, has not been found to be desirable since then the antilock system would be entirely disconnected for the unstable period of MMV 49, that is, for about 30 milliseconds. If, during this time, the vehicle passes over a stretch of road in which the road condition becomes poorer, that is, in which the road surface becomes more slippery, then really high deceleration values of the vehicle wheels may arise. This is the reason why the first threshold switch is not entirely disconnected, but its switching threshold is shifted deep in negative direction. In spite of filtering of chassis and suspension oscillations, substantial wheel deceleration values may be reached and, even during the delay time of 30 milliseconds, can be reliably sensed.

The shifting of the threshold levels of the second threshold switch 36 is provided to sense different road conditions. The first timing circuit 48, in contrast to the second timing circuit 49, is triggered only if its input signal changes from 0 to 1. This is the case only when the first threshold switch 35 responds, that is, if a wheel deceleration of −3.5g is exceeded. The first timing circuit 48 then provides a 1-signal to the threshold shift input V of the second threshold switch 36 after its delay time, for example about 20 milliseconds. This shifts the off-threshold of the second threshold switch 36 to −3.1g. If the road surface provides good friction, that is, the tires have a good grip, then the wheel deceleration rapidly decreaeses due to response of the first threshold switch 35, which causes a drop in pressure. The off-threshold of the second switch 36, which has been shifted to −3.1g is thus exceeded in positive direction already before the delay time of the first timing MMV 48, so that the second threshold switch 36 changes back in its quiescent condition already in advance of the delay phase of the vehicle wheel, and provides a 0-signal. This provides for early interruption of the pressure drop phase, and the control amplitude of the pressure remains small.

If the road surface is slippery, then high deceleration values will be reached in spite of a drop in pressure to the wheel brake; in any event, more than 20 milliseconds will pass until the deceleration reaches again −3.1g. Until this time, therefore, the threshold response level of the second threshold switch 36 has been shifted to its original value, and the brake pressure is dropped for such a time until a positive wheel acceleration of +1.0g is obtained. The average brake pressure level is thus dropped for a longer period of time, providing for optimum matching of the links of the various phases of the control cycle to the road conditions, for example to a slippery road condition. Thus, also if the road surface should be slippery, the pressure control amplitudes remain small.

During quiescent conditions of the circuit, the threshold switching levels of the third threshold switch 37 are shifted to high positive values. They are set for their normal values only after setting of the FF 46, which provides a 1-signal at the threshold change input V of the third threshold switch 37. This feature is used to increase noise rejection. In ordinary driving, without brake operation, and if the road surface is not perfectly smooth, the vehicle chassis, due to the spring suspension will sense imaginary wheel acceleration and deceleration values in the order of about 1g. These changes in wheel speed from vehicle speed are determined by shift or swing of the vehicle suspension, and do not actually arise. The normal switching thresholds of the third threshold switch 37 would, however, be reached even without operating the brake, and the inlet valve 14 would be unnecessarily operated. Shifting the switching threshold in positive direction avoids this difficulty.

Figure 4:
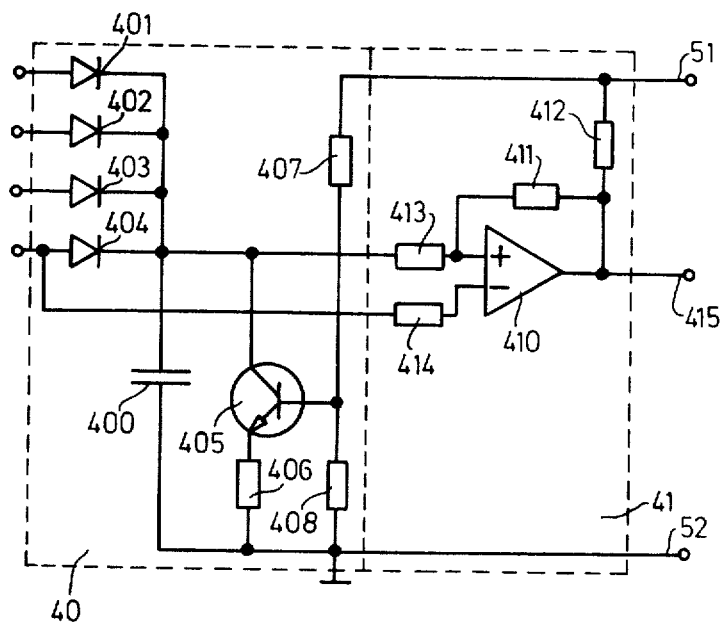
FIG. 4 is a partial circuit diagram of sub-units used in FIGS. 2 and 3.

The vehicle speed simulation stage 40, and a comparison circuit 41 is seen in detail in FIG. 4. The speed stimulation stage includes a storage capacitor 400, connected on the one hand to negative bus 52 and on the other with the cathodes of four diodes 401, 402, 403, 404. The anodes of diodes 401 to 404 form the inputs of the vehicle speed simulation stage 40. They are, each, connected with the outputs of the first low pass filter 32 associated with the antilock systems of the four wheels of the vehicle. The series circuit of a transistor 405 and emitter resistor 406 is connected in parallel with capacitor 400 to form a constant current source. The base of transistor 405 is connected to the tap point of a voltage divider formed of resistors 407, 408 and connected between positive bus 51 and negative bus 52.

The speed comparison circuit 41 includes an operational amplifier 410, the output of which is connected over a resistor 411 with the non-inverting input thereof. Load resistor 412 connects the output of operational amplifier 410, and of the circuit, indicated at 415, with positive bus 51. The non-inverting input of the operational amplifier is connected with coupling resistor 413 to the cathodes of the diodes 401–404; the inverting input is connected over a resister 414 to the anode associated with the wheel with which the circuit is being used, in the illustration of FIG. 4, with the anode of diode 404, or, in other words, the output from low pass filter 32 (FIG. 2).

Operation: that one of diodes 401 to 404 is conductive which has its anode at the highest voltage. Capacitor 400 is thus charged to a value which is approximately proportional to the speed of the wheel which rotates fastest. A vehicle which has independent anti-lock systems for each of the wheels usually operates in such a manner that at least one of the wheels is not locked.

The voltage on storage capacitor 400 thus provides a good approximation of circumferential vehicle speed. If all four wheels should lock simultaneously, then constant current source 405, 406 is provided, which permits discharge of the storage capacitor thereover, since all four diodes 401 to 404 are pulled in blocking direction. The base voltage, that is, the reference voltage of voltage divider 407, 408 is so set that the rate of discharge of the discharge current corresponds to a vehicle deceleration of about 1.g, to provide a simulation of decrease in vehicle speed.

Operational amplifier 410 forms a threshold switch, and provides a 1-signal at all times when the input voltage of the inverting input is more negative than the input voltage of the non-inverting input. The operational amplifier 410 then provides a 1-signal as soon as the circumferential wheel speed of the respective vehicle wheel — in this case derived from the voltage at the anode of diode 404, output of low pass filter 32 (FIG. 2) — drops below the vehicle speed, as determined, or simulated by circuit 40. Diodes 401 to 404 only become conductive when they have a threshold voltage of more than 0.7 volts thereon. The output voltage derived from the low pass filter 32, by suitable dimensioning of the low pass filter, can be so set that the diode threshold value corresponds to a speed difference of about 15 km/h.

Practical experiments have shown that it is not possible to reliably prevent locking of a vehicle wheel in all instances by an antilock system if an acceleration control with various wheel rate-of-speed-change threshold switches is used.

If the road surface, during braking, gradually becomes more slippery, then the vehicle wheel may go through normal acceleration control cycles, including deceleration phases and re-acceleration phases, while its circumferential speed rapidly decreases. After about three to five control cycles the wheel can come to complete standstill — that is, is locked — and none of the acceleration threshold switches will then respond. The speed comparison circuit 41 avoids this difficulty.

Operation of speed comparison feature, with reference to FIGS. 2 and 3: if the circumferential wheel speed becomes less than the corresponding to about 15 km/h, then the speed comparison circuit 41 will provide a 1-signal. Ordinarily, the wheel will not be in an acceleration phase, so that the third threshold switch 37 will provide a 0-signal. The output of the AND gate, therefore, will have a 1-signal which is transmitted by the OR gate 44 on winding 25 of the drain valve 19. Simultaneously, the 1-signal is applied to OR gate 45 so that the inlet valve 14 is closed. Response of the speed comparison circuit 41 thus provides for immediate drop in braking pressure. If the third threshold switch 37 provides, however, a 1-signal, then the comparator 41 will not be effective, since AND gate 43 will block. Under such conditions it would not make sense to drop the braking pressure, since this wheel is in a phase of re-acceleration. If, however, after the third threshold switch 37 resets, and the speed comparison circuit 41 still continues to provide a 1-signal, then braking pressure is again dropped.

Figure 5:
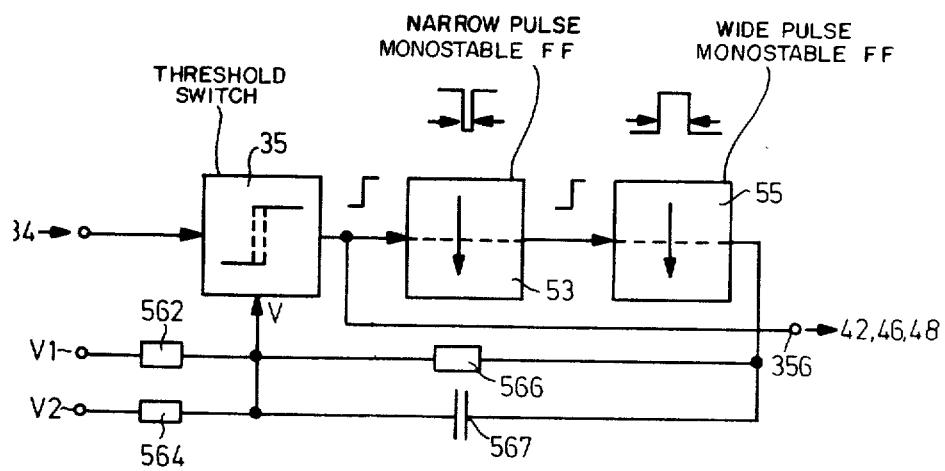
FIG. 5 is a block circuit diagram of a first threshold switch, with additional features.
Figure 6:
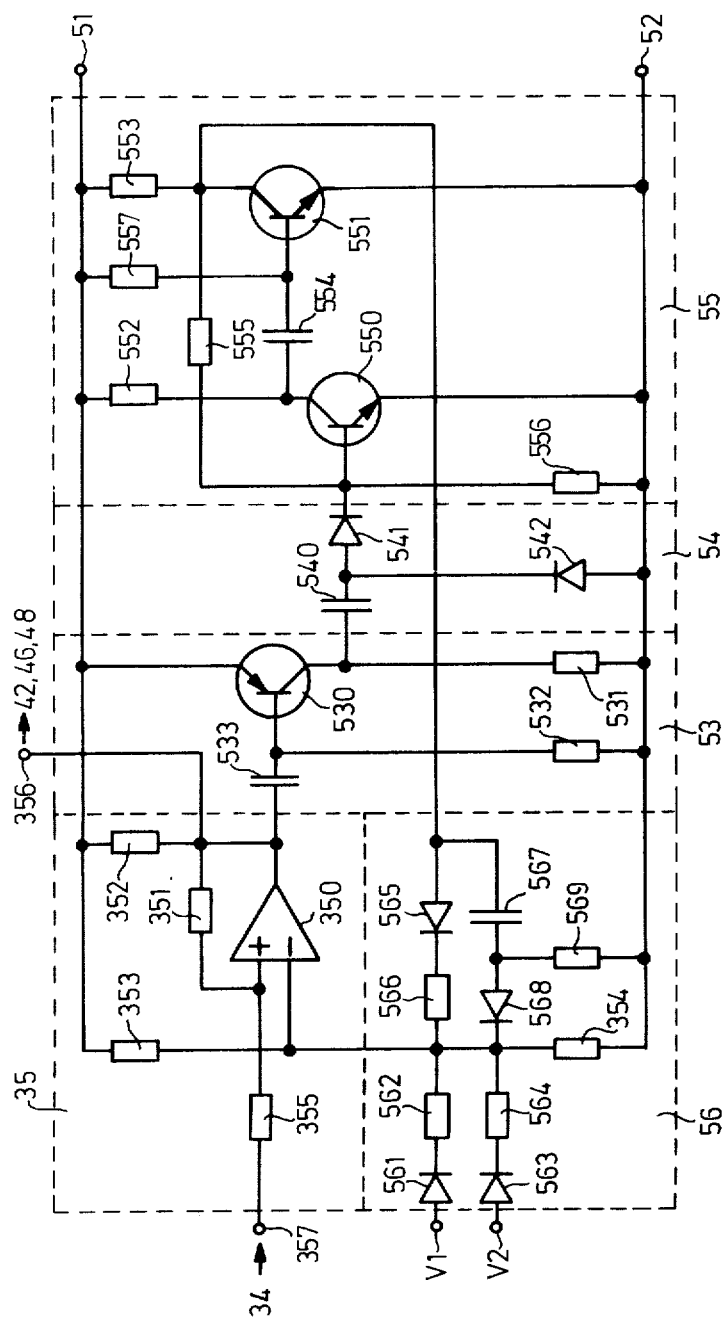
FIG. 6 is a more detailed circuit diagram of the threshold switch of FIG. 5.

Threshold switch circuits, with reference to FIG. 5 and 6: threshold switch 35 is shown in detail in FIGS. 5 and 6, and is representative of all threshold switches. All correction signals are considered together and apply to a threshold shift input V. The first threshold switch 35 is connected to an output terminal 356. Two series connected timing circuits 53, 55 are connected to the output of the first threshold switch 35. The output of the second timing circuit 55 is galvanically connected over a resistor 566 and with a capacitor 567 to the threshold shift input V. The threshold shift input V, additionally, has two resistors 562, 564 connected thereto, the free terminals of which form the shift inputs V1, V2. The general block diagram is seen in FIG. 5.

The detail diagram of the circuit will be explained in connection with FIG. 6: the first threshold switch 35 includes an operational amplifier 350, the output of which is connected over a resistor 351 with its non-inverting input. A load resistor 352 connects with positive bus 51. The inverting input of operational amplifier 350 is connected to the tap point of a voltage divider formed of two resistors 353, 354 and connected between positive and negative buses 51, 52. The input to the operational amplifier 350 is to its non-inverting connection over an input resistor 355 connected to input terminal 357. The input terminal 357 is connected to the output of the second low pass filter 34. The output of operational amplifier 350 is connected to the output circuit 356 of the first threshold switch 35 for further connection to stages 42, 46, 48.

The third timing circuit 53 has a pup transistor 530 as its active element, the emitter of which is connected to positive bus 51, and the collector of which over a collector resistor 531 with negative bus 52. The base of transistor 530 is connected by a capacitor 533 to the output 356 of the first threshold switch 35 and, additionally, by a base resistor 532 to negative bus 52. A differentiator network 54 formed of a capacitor 540, and a series connected diode 541 is connected to the output of the timing circuit 53. Differentiator circuit 54 is a dynamic input circuit for the fourth timing circuit 55. The series circuit of capacitor 540 and diode 541 is connected to the collector of transistor 530 and to the base of a transistor 550 in the fourth timing circuit 55. The junction between capacitor 540 and diode 541 is connected over a diode 542 to negative bus 52.

The fourth timing circuit 55 is a monostable flip-flop, including two npn transistors 550, 551. Both transistors are connected with their emitters to negative bus 52, and their collectors over respective collector resistors 552, 553 to positive bus 51. The coupling between the collector of one transistor to the base of the other is, on the one hand, capacitative over capacitor 554 and, on the other, galvanically, over a resistor 555. The base of transistor 550 is connected over a resistor 556 to negative bus 52; the base of transistor 551 is connected over resistor 557 to positive bus 51.

A correction circuit 56 is connected to the inverting input of the operational amplifier 350, and with it to the tap of the voltage divider 353, 354. The threshold shift inputs V1, V2 are connected to the inverting input of operational amplifier 350 by means of a series circuit of a diode and a resistor, each; terminal V1 is connected over diode 561, and resistor 562 to the correction circuit; terminal V2 is connected over diode 563 and resistor 564 to the tap point. The collector of transistor 551 is likewise connected over the series circuit formed of diode 565 and resistor 566 to the tap point of the voltage divider and thus to the inverting input of operational amplifier 350. A further series circuit formed of a capacitor 567 and a diode 568 is in parallel to the series circuit of diodes 565 and resistor 566 connected from the collector of transistor 551. A resistor 569 connects from the junction between capacitor 567 and diode 568 to negative bus 52.

Operation: the differentiator 33 is so constructed that the output signal of the differentiator 33 changes in positive direction when deceleration is to be measured and in negative direction, when acceleration (positive rate of change of wheel speed) is to be measured. Usually, the differentiator 33 will include an operational amplifier, the inverting input of which is the control input, thereby providing output signals with the foregoing polarity. The operation of the circuit will be described in connection with this assumption.

Operational amplifier 350 in the first threshold switch 35 is controlled at its non-inverting input, and the output signal thereof will jump to a 1-value as soon as the voltage at input terminal 357 exceeds that of the tap point voltage at the voltage divider 353,354 in positive direction. This is the case upon wheel deceleration. The value of resistor 351 determines the switching hysteresis of the threshold switch 35. The tap point of the voltage divider 353, 354 can be set by adjustment of the resistance values; the voltage level can be shifted, further, by applying potentials to the threshold shift input terminals V1, V2, as well as over resistor 566 over the diode 568, in positive direction, to correspond to a shift of the input threshold level towards greater delays. To shift the threshold levels, the inputs V1, V2, or the collector of transistor 551 must have 1-signals applied. The value of the resistors 562, 564, 566 determine the relative shift in threshold level.

Transistor 530 in third timing circuit 53 is normally conductive, since its base has base current applied over resistor 532. In quiescent condition, therefore, the collector of transistor 530 will have a 1-signal applied. The fourth timing circuit 55, under quiescent condition, then will have transistor 550 blocked and second transistor 551 conductive, since the base of the first transistor is connected over resistor 556 to the negative bus 52, and the base of the second transistor is connected over resistor 557 to positive bus 51. In quiescent condition, therefore, the output of the first timing circuit 55, that is, collector of transistor 551, will have a 0-signal.

Upon response of the first threshold switch 35, that is, when the output signal of operational amplifier 350 changes from 0 to 1, a voltage jump will be applied to capacitor 533 which is transferred to the base of transistor 530. Transistor 530 will block for a short time, until the capacitor 533 is again charged over resistor 532. During this blocking time T1, which, in the example will be about 5 milliseconds, the third timing circuit 53 will still continue to provide a 0-signal. Capacitor 540 in differentiating circuit 54 transfers the pulse flanks, transmitted from the third timing circuit 53. The negative pulse flank, arising at the beginning of the output pulse of the third timing circuit, is short circuited by diode 542 to negative bus 52. The positive pulse flank, however, at the termination of the output pulse of the third timing circuit 53, is transmitted over diode 541 to the base of transistor 550 which, then, will become conductive. Monostable FF 55 is triggered, therefore, about 55 milliseconds after response of the first threshold switch 35 and provides a 1-signal during its unstable state. The pulse duration T2 of the monostable FF 55 is set, in an example, to about 50 milliseconds.

The shift of the response threshold of the first threshold circuit 35 in dependence on input signals at the shift inputs V1, V2, in the circuit of FIG. 6, is shown in Table 3. There may be a slight change, in that, upon control of the first threshold shift terminal V1 with a 1-signal, the on-threshold changes to −2.5g, and the off-threshold to +2g; further changes may arise due to the influence of the fourth timing circuit 55. Immediately after the positive output pulse flank of the fourth timing circuit 54, that is, 5 milliseconds after response of the first threshold switch 35, capacitor 567 and a diode 568 will transmit a high voltage jump to the inverting input of operational amplifier 350, so that its input threshold level is shifted to a very high negative level, for example −10g, for a short period of time. After capacitor 567 has recharged over resistors 553, 569, diode 565 and resistor 566 will, for the pulse duration of the fourth timing circuit 55, continue to apply a static correction voltage to the inverting input of the operational amplifier 350. This static correction voltage shifts the input threshold level of the first threshold switch 35 to −3.5g, and the off-level to +1.0g, as shown in line 2 of Table 3. This normal position of the first threshold switch 35 is thus retained only for about 50 milliseconds.

A control cycle using the circuit of FIG. 6 is illustrated in Table 5.

Table 5 is based on a second control cycle, that is, that a first control cycle has occurred earlier. This means that the FF 46 is already set, that the threshold input shift terminal V1 of the first threshold switch 35 has a 1-signal applied, and that pulse source 47 operates and provides pulsed output.

At a small wheel circumferential deceleration, for example −1g (line 1, Table 5) braking pressure rises in pulsed stages. The on-threshold of the first threshold switch 35 is at −2.5g, since the threshold shift terminal V1 has a 1-signal applied. The condition upon incipient wheel locking, that is, wheel deceleration of −3g a is shown in line 2 of Table 5. The first threshold switch 35 provides a 1-signal for 5 milliseconds. After the 5 milliseconds — the time constant T1 of the third timing circuit 53 — the on-threshold level of the first threshold switch 35 is shifted over capacitor 567 to −10g, so that the first threshold switch 35 cannot return to its initial state under any condition, and provides a 0-signal. After the 5 milliseconds have elapsed, the threshold level of the first threshold switch 35 is set to its normal value of −3.5g. Pressure relationship, from now on, provides three possibilities:

1. During the 5 milliseconds, braking pressure is dropped by about 10 to 15 bars. It may occur that this pressure drop is sufficient to terminate locking. After 50 milliseconds the wheel deceleration is then smaller than 2.5g, so that the first threshold switch 35 will not again respond.

2. The road condition is such that, even after the brief drop in pressure, the wheel deceleration continues to have values between −2.5 and −3.5g. The threshold level of −3.5g is never reached, but the first threshold switch 35 continues to respond when, after the 50 milliseconds have elapsed, the threshold level has changed again to −2.5g. This condition, which is shown in line 2 of Table 5, causes pulsed drop in braking pressure. The pulse frequency is about 20 Hz. This frequency is determined by the pulse duration T2 of the fourth timing circuit 55.

3. The road surface is so slippery that, in spite of the pressure drop of 10 to 15 bars, the wheel circumferential deceleration continues to increase, and exceeds the shifted input level already before 50 milliseconds have elapsed. The first threshold switch 35 provides a 1-signal which continues until its off-level has been exceeded in positive direction. This case corresponds to a wheel deceleration of −4g, as shown in line 3 of Table 5.

All three conditions are followed by a constant pressure phase by resetting of the second threshold switch 36, as illustrated in line 4 of Table 5. The condition is the same as that shown in line 3 of Table 4. The further progress of the control cycle in Table 5 is similar to that in Table 4, and is not described again separately.

Figure 7:
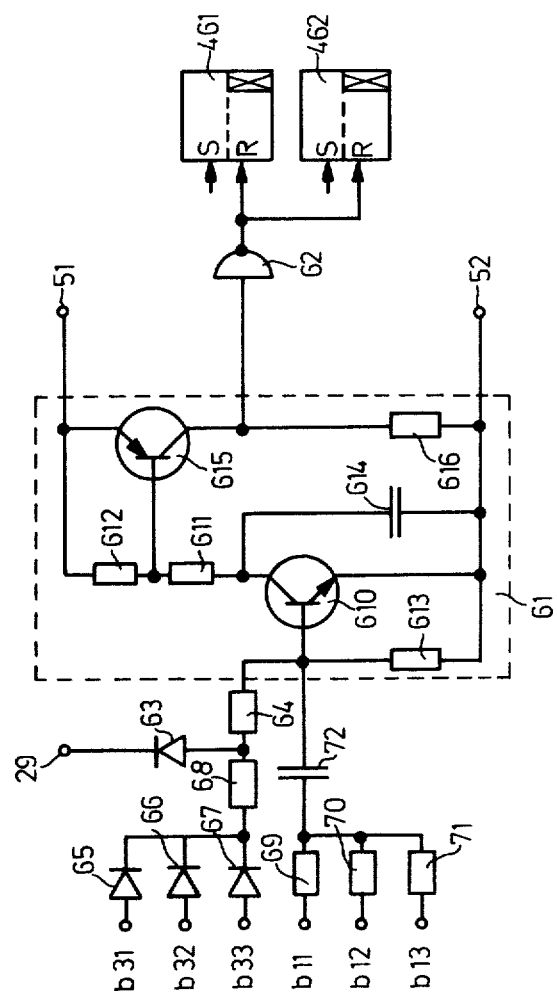
FIG. 7 is a circuit diagram illustrating a feature of the circuit of FIG. 3.

The bistable FF 46 (FIG. 3) is reset by a circuit which may be termed a turn-off stage, and is shown at 61 in FIG. 7. The output of the turn-off stage 61 is connected over an inverter 62 to the reset terminal R of two bistable FFs 461, 462 separately. The two bistable FFs 461, 462 are utilized with the antilock systems of different vehicle wheel axles. They correspond to the bistable FFs 46 of FIG. 3.

Turn-off stage 61 has an npn input transistor 610 which has its emitter connected to negative bus 52 and its collector over a series circuit of resistors 611, 612 to positive bus 51. The base of transistor 610 is connected over 613 to negative bus 52. A capacitor 614 is connected between the collector of transistor 610 and negative bus 52. The junction point of the two resistors 611, 612 is connected to the base of a pnp transistor 615, the emitter of which is connected to positive bus 51 and its collector over a resistor 616 to negative bus 52. The collector of transistor 615 forms the output of the turn-off stage 61.

Terminal 29 (FIG. 1) connected to the brake light switch is connected to a diode 63, and to a resistor 64 and then to the base of the transistor 610. The cathodes of three diodes 65, 66, 67 are connected to a resistor 68 which connects to the junction between diode 63 and resistor 64. The anodes of diode 65, 66, 67 are connected to the outputs of three threshold switches 37, associated with the antilock systems of different vehicle wheels. Three parallel connected resistors 69, 70, 71 are connected over a capacitor 72 to the base of transistor 610. The free terminals of resistors 69, 70, 71 are connected to the outputs of three of the first threshold switches 35 which, in turn, are connected to the antilock systems of different vehicle wheels.

In quiescent condition of the turn-off circuit 61, npn transistor 610 is blocked, since its base is connected to negative voltage over resistor 613. Capacitor 614 is then charged over resistor 612, 611 to the supply voltage of the positive bus 51. pnp transistor 615 is blocked, since its base is connected over resistor 612 to positive voltage bus 51. In quiescent condition, therefore, the output of the turn-off stage 61 will be a 0-signal, which is inverted in the inverter stage 62 into a 1-signal. This 1-signal resets the two bistable FFs 461, 462.

Diode 63 is so poled, that it will block upon operation of the brake pedal, and thus becomes ineffective. As soon as the brake pedal is released, terminal 29, and thus the cathode of diode 63 is connected to negative voltage. All 1-signals derived from capacitor 72 or diode 65, 66, 67 are thus short circuited over diode 63. Thus, if the brake is not operated, transistors 610 and 615 remain blocked, and inverter 62 provides a 1-reset signal to the FFs 461, 462.

Upon response of a first threshold switch 35, during braking, a pulse is transmitted over capacitor 72 to the base of the transistor 610. This pulse is a 1-signal, and transistor 610 becomes conductive, causing rapid discharge of capacitor 614. During an antilock control cycle the first and third threshold switches of the various antilock systems will periodically respond, so that transistor 610 is almost continously conductive, and transistor 615 will be continuously conductive. Resistors 611, 612 are so dimensioned that after the transistor 610 has blocked, about 300 milliseconds pass until capacitor 614 is charged to such a value that transistor 615 will also block. This ensures that, during a braking mode, the bistable FFs 461, 462 will be set upon response of the first threshold switch 35 and will be reset after 300 milliseconds after release of the brake pedal. Diode 65, 66, 67, and resistor 69 to 71 are provided to reset the FFs 461, 462 even if the brake light switch should fail. If the brake light switch should fail, the third threshold switch of the various antilock systems will provide static 1-signals to the diodes 65 to 67, which are then connected to the base of transistor 610, so that during response time of the third threshold switch it will be conductive and discharge capacitor 614. It is usually not the case that 300 milliseconds elapse during two subsequent connection cycles of the third threshold switch, so that, in actual operation, transistor 615 remains conductive, if the antilock system has responded. The first threshold switches of the various antilock systems are connected over capacitor 72 dynamically to the base of the transistor 610. This dynamic coupling is desirable since, otherwise, the first threshold switches in the circuit of FIG. 3 could, possibly, not revert to the output state. As seen in Table 3, the turn-off level of the first threshold switch 35 is changed to 1g upon a 1-signal at the output of the first bistable FF 46. If, for example, at the end of the control cycle the acceleration of the wheel is not that high, the first threshold switch 35 remains set at a 1-signal. Upon static coupling to the base of transistor 610, this 1-signal would hold this transistor 610 constantly conductive, so that the bistable FFs 461, 462 could not be rest, and the circuit would be caught in this condition.

The dynamic coupling of capacitor 72 prevents that 1-signals at the outputs of the first threshold switch are transmitted to the transistor 610. The transistor 610 will, therefore, block in any event when all the third threshold switches have changed back to their quiescent state, and when the brake pedal has been released.

FIG. 7 illustrates two bistable FFs 461, 462, and three first and third threshold switches. Such an arangement is suitable for a passenger vehicle antilock system. Each axle has a single bistable FF 461, 462 associated therewith. A two-axle vehicle provides a separate antilock system for each one of the two front wheels, and a single antilock system for the rear axle. This is sufficient for the rear axle since it supplies, anyway, only one third of the overal braking effort. It is suitable to provide a common bistable FF 461 for both antilock systems of the front axle, which single FF is set by the output signals of the associated first threshold switch. This ensures that upon first response of any antilock system, only slow pressure rise, in pulses, can occur in any wheel associated with an antilock system. If the road surface is non-symmetrical, for example slippery on one side of the vehicle, and better gripping on the other, then braking pressure at the vehicle side in which the road surface provides better grip cannot rise too fast, and steering with uneven braking effort is facilitated. The influence which the braking effort has on steering will be different at both sides of the vehicle; this difference is held to a minimum by the system.

The vehicle wheel antilock system, in accordance with the invention, provides good control of the pressure amplitudes on braking, and particularly the example of FIG. 3, permits rapid matching of average braking pressure to road condition, since the turn-off threshold of the second threshold switch is changed after response of the first threshold switch for a predetermined delay time. This delay time can readily be matched to the type of vehicle with which the antilock system is used. The circuit arrangement of the first threshold switch, is constructed in accordance with FIG. 6, provides for a particularly precise control of braking pressure upon incipient wheel locking, and unnecessary pressure drops, or pressure swings are effectively avoided.

Various changes and modifications may be made within the scope of the inventive concept, and features described with any one of the embodiments may, likewise, be used with any other. For example, the FF 46 (FIG. 3) which changes the threshold setting of the third threshold switch 37 may be used in connection with the embodiment of FIG. 2, without the additional feature of the pulse source 47 or the pulse source 47 may be used, independently, and suitably connected in the circuit of FIG. 2.

We claim:

1. Fluid brake vehicle antilock system having a wheel brake cylinder, electrically operated and controlled fluid inlet and outlet valve means (14, 19),
   means (30, 31, 32, 33) sensing acceleration of the wheels of the vehicle and including a differentiator (33),
   threshold switch means including first, second and third threshold switches (35, 36, 37) connected to said acceleration sensing means and responding upon predetermined sensed rates of change of wheel speed,
   and a logic network connected to said threshold switches selectively controlling the energization of the electrically controlled fluid inlet and outlet valve means to command pressure rise, constant pressure and pressure drop in the wheel brake cylinder;
   wherein said acceleration sensing means includes a first low pass filter means (32) connected in advance of the input of the differentiator (33);
   a second low pass filter means (34) connected behind the output of the differentiator (33);
   and conjunctive means (42) controlling the electrical control of the outlet valve means (19), said conjunctive means having one input connected to the first threshold switch (35) and another input connected to the second threshold switch (36), said first threshold switch having its input connected to the differentiating means through the second low pass filter means (34) and said second threshold switch (36) having its input connected to the differentiator (33) directly;
   the third threshold switch (37) being connected to the output of the second low pass filter means (34);
   and means (45) disjunctively connecting the inlet valve means (14) and the first and third threshold switches (35, 37).

2. System according to claim 1 further comprising an interlock connected between the electrical connection of said outlet valve and said disjunctive connection means (45).

3. System according to claim 1 further comprising a speed comparison stage (41) comparing individual wheel speeds with vehicle speed;
   and means (44) disjunctively controlling the outlet, or drain valve (19) from said conjunctive means (42) or said speed comparison stage (41).

4. System according to claim 3 wherein the speed comparison stage comprises a comparator circuit having applied as one input a signal representative of wheel speed and as another input a signal representative of simulated vehicle speed.

5. System according to claim 3 further comprising conjunctive means (43) having its output connected to said disjunctive control means (44) for the outlet or drain valve (19), the conjunctive means (43) having one input connected to the speed comparison stage (41) and another input connected to a third threshold switch (37) of said threshold switches.

6. System according to claim 1 wherein the first threshold switch (35) includes threshold shift means having a threshold shift input (V) shifting the threshold response level thereof;
   and a differentiator circuit (567, 568, 569) is provided, connecting the output of the third threshold switch with said shift input (V).

7. System according to claim 1 wherein said threshold switches comprise a fourth threshold switch (38) having a threshold response level responding to high positive wheel acceleration, said fourth threshold switch being connected to the output of the differentiator (33);
   and an AND gate (50) is provided, connected in advance of the electrical connection to the inlet valve (14), said AND gate having its input connected to the output of the fourth threshold switch (38) and the output of the disjunctive connection means (45).

8. System according to claim 1 further comprising a bistable flip-flop (FF) (46) forming a control memory, said bistable FF having a set input (S) connected to the output of the first threshold switch (35);
   a pulse source (47) is provided having a blocking input (E), the output of the bistable FF (46) being connected to the blocking input (E) of the pulse source, the output of the pulse source being connected to the electrical connection for the inlet control valve (14).

9. System according to claim 8 wherein the threshold switches comprise a third threshold switch (37) connected to the output of the second low pass filter (34), said third threshold switch (37) includes a circuit shifting the threshold response level thereof, and having a threshold shift terminal (V) which, upon energization, shifts the threshold response level;
   said first threshold switch (35) includes a circuit shifting the threshold response level thereof and having a threshold shift terminal (V) which, upon energization thereof, shifts the threshold response level;

and wherein the output of the bistable FF (46) is connected with the threshold shift input (V) of the third threshold switch (37) and with the threshold shift terminal (VI) of the first threshold switch (35).

10. System according to claim 9 wherein the second threshold switch (36) includes a circuit shifting the threshold level thereof and having a threshold shift terminal (V) which, upon energization, shifts the threshold level of the second threshold switch (36), to distinguish between different road conditions;

a timing circuit (48) is provided, the output of the first threshold switch (35) being connected to the timing circuit (48) which has its output connected to the threshold shift input (V) of the second threshold switch (36).

11. System according to claim 10 wherein the circuit shifting the threshold response level of the first threshold switch (35) has two inputs (V1, V2) and shifting the threshold response level by different values, the second threshold shift terminal (V2) shifting the threshold level by a higher value than said first input, in order to suppress error signals due to oscillation of the suspension of the vehicle;

a second timing circuit (49) is provided, said second timing circuit being controlled by the output of the first threshold switch (37) and having its output connected to the second threshold shift terminal (V2) of the first threshold switch to shift the threshold level during the timing period thereof.

12. System according to claim 8 wherein the bistable FF has a reset terminal (R), a reset control stage (61) is provided, said reset control stage including a timing circuit;

the vehicle has a brake light switch (28, 29), and a series circuit comprising a diode (63) and a resistor (64) connecting the brake light switch (28, 29) to the input of the reset control stage (61).

13. System according to claim 12 wherein only a single reset control stage (61) is provided for all brake antilock systems in the vehicle, said single reset control stage having its output connected to the reset terminals of all bistable FFs (46, 461, 462) associated with individual control systems of the individual axles of the vehicle.

14. System according to claim 13 wherein the threshold switches associated with the axles of the vehicle comprise a third threshold switch (37) connected to the output of the second low pass filter (34) of each individual control system;

and resistance means (68) connecting the outputs of all the third threshold switches (37) to the input of the reset control circuit (61).

15. System according to claim 13 comprising a capacitor (72) coupled to the outputs of the first threshold switches (35) of the antilock control systems associated with individual vehicle axles, the capacitor (72) being connected to the input of the reset control circuit (61).

16. System according to claim 12 wherein the diode (63) is so poled that the output of the reset control circuit (61) is short circuited when the brake is not operated, the reset control circuit (61) providing a reset signal to the bistable FFs (46, 461, 462) upon short circuiting of its input.

17. System according to claim 1 further comprising a speed comparison stage (41) comparing individual wheel speeds and vehicle speeds, said speed comparison stage comprising an operational amplifier (410) having a resistor (411) in its feedback circuit to operate as a threshold switch;

said operational amplifier having two inputs, one input having applied thereto a signal representative of wheel speed, and the other input having applied thereto a signal representative of simulated vehicle speed.

18. System according to claim 1 wherein a vehicle speed simulation stage (40) is provided, to provide an output signal representative of vehicle speed, comprising a storage capacitor (400), a constant current source (405, 406, 407, 408) loading said storage capacitor;

a group of diodes (401, 402, 403, 404), and means connecting signals representative of wheel speed to the diodes, the outputs of said diodes being connected to the storage capacitor (400).

19. System according to claim 18 further comprising a speed comparison stage (41) comparing individual wheel speeds and vehicle speed, said speed comparison stage comprising a comparator circuit having applied thereto the outputs of said diodes (401 to 404), and having a threshold level which is determined by the unblocking threshold voltage of the diodes (401 to 404).

20. System according to claim 1 further comprising two timing circuits (53, 55) serially connected to the output from the first threshold switch (35);

wherein said first threshold switch includes a circuit shifting the threshold response level thereof and having a threshold shift terminal (V) which, upon energization, shifts the threshold response level of said threshold switch (35);

and wherein a connection circuit is provided from the output of the second serially connected timing circuit (55) to the threshold shift terminal (V) of said first threshold switch, said connection circuit comprises a parallel connection of a resistor (566) and a capacitor (567).

21. System according to claim 20 wherein the normal threshold level of the first threshold switch is set at about −2.5g;

the first timing circuit providing a delay time (T1) of about 5 milliseconds;

the second timing circuit (55) providing a delay time (T2) of about 50 milliseconds;

and the threshold shift circuit of the first threshold switch (35) is set to change the threshold response level of the first threshold switch to the value of −3.5g about 5 milliseconds after first response of the first threshold switch and for the time duration (T2) of the operation of the second timing circuit (55) (FIG. 5).

22. System according to claim 1 wherein the first low pass filter means (32) has a band pass widths of about 45 Hz, and said second low pass filter means (34) has a band pass widths of about 8 Hz.

* * * * *